US006574867B1

(12) United States Patent
Bradshaw

(10) Patent No.: US 6,574,867 B1
(45) Date of Patent: Jun. 10, 2003

(54) TOE KICK SAW SYSTEM

(76) Inventor: Thomas Bradshaw, 1912 Talkeetna St., Anchorage, AK (US) 99508

( * ) Notice: Subject to any disclaimer, the term of this patent is extended or adjusted under 35 U.S.C. 154(b) by 0 days.

(21) Appl. No.: 09/978,606

(22) Filed: Oct. 15, 2001

(51) Int. Cl.[7] .......................... B23D 45/16; B23D 47/00
(52) U.S. Cl. ........................................... 30/122; 30/388
(58) Field of Search ................ 30/388, 122; 83/698.41; 144/218, 222, 237, 230, 136.95; 407/41, 48, 40, 60

(56) References Cited

U.S. PATENT DOCUMENTS 2,610,658 A * 9/1952 Koeling ................. 144/136.95
2,823,713 A * 2/1958 Goldsmith ............. 144/136.95
5,815,932 A * 10/1998 Presher et al. ................ 30/373
5,974,674 A * 11/1999 Kelly .......................... 30/391
6,463,970 B1 * 10/2002 Bradshaw ................... 144/237

* cited by examiner

*Primary Examiner*—Hwei-Siu Payer
(74) *Attorney, Agent, or Firm*—Michael Tavella

(57) ABSTRACT

A device for cutting floors that attaches to the arbor on a circular saw, including an extension shaft, and an outer brace to support the extension shaft. The extension shaft extends past the outer brace a distance sufficient to permit a small trim blade, with a guard to fit under a cabinet toe kick. The small blade is held on the end of the extension shaft and is provided with a small guard. The device allows a user to place the circular saw on a floor and to position the small blade under the toe kick against the cabinet bottom to cut a line in the floor along the base of the cabinets. In one embodiment, the base plate of the circular saw is removable to allow slightly greater cutting depth. The saw attachment allows a worker to cut through a floor and sub floor around base cabinets.

14 Claims, 5 Drawing Sheets

TOE KICK SAW SYSTEM

BACKGROUND OF THE INVENTION

1. Field of the Invention

This invention relates to saws for removing floors and particularly to saws that cut floors under the toe kick of cabinets.

2. Description of the Prior Art

In remodeling, one of the more frequent types of jobs involves remodeling kitchens or other spaces that have base cabinets installed. Often, these jobs call for a new floor. In many cases, the original cabinets are not removed, but refinished. To replace the floor the old flooring must be cut out and removed. Often this requires removal of the sub floor as well. In cases where the cabinets are not removed, removal of the floor under cabinet toe kicks can be difficult. A toe kick is a small recess, usually about 3 inches high that is built into the front of cabinets to allow a person to get close to a cabinet without having the person's feet hit the cabinet. The recess allows the person's toes to fit under the cabinet front.

While the toe kick is a very convenient feature for cabinets, it is not so convenient when workers have to remove flooring from under them.

Presently, there is only one power tool that can fit under this space. This is a single purpose toe kick saw that has limitations and is difficult to use. There is also a drill type attachment that can be used, but is dangerous in its operation. Both of these tools are expensive and are not likely to be found in a typical carpenter's toolbox. Without that tool, workers have to break out the floor using chisels or wrecking bars to pry up the flooring. This can cause problems if the flooring is broken out under the cabinets.

BRIEF DESCRIPTION OF THE INVENTION

The instant invention overcomes this problem. It is a device that fits onto a standard type circular saw. It has an attachment arbor that attaches to the arbor on the saw. It has an extension shaft and an outer brace to support the extension shaft. The extension shaft extends past the outer brace a distance sufficient to permit a small trim blade to fit under the cabinet toe kick. The small blade is held on the end of the extension shaft and is provided with a small guard.

The attachment is designed to fit any size of circular saw. The only adjustment needed is to the length of the extension shaft between the saw arbor and the inside of the guard. In practice different length extension arbors can be made to fit the most common circular saws.

The device allows a user to place the circular saw on a floor and to position the small blade under the toe kick to cut a line in the floor along the base of the cabinets. In one embodiment, the base plate of the circular saw is removable to allow slightly greater cutting depth. This depth is greater than that available in any other toe kick saw.

In this way, the saw attachment allows a worker to cut through the floor and, if necessary, the sub-floor completely around the base cabinets. Once this cut is made, workers can then cut and pry up the rest of the floor, knowing that the floor will come up along the lines previously cut, leaving the cabinets in place and unharmed. Workers can then lay a new floor and sub floor in the space and proceed with the job.

This tool allows workers to cut the floor with a power tool owned by virtually all carpenters-a circular saw. This not only saves time, but also reduces the cost of jobs by not having to buy or rent the expensive single purpose toe kick saws or the dangerous drill type attachments.

The attachment in this

DETAILED DESCRIPTION OF THE INVENTION

Figure 1:
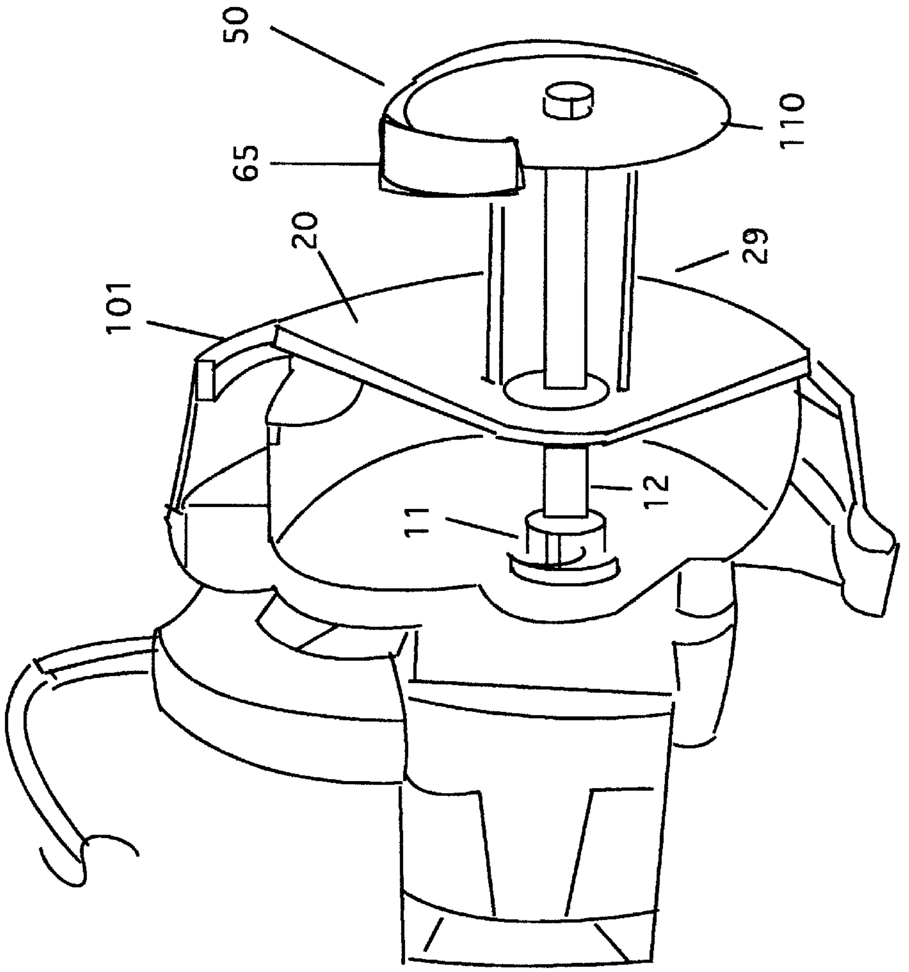
FIG. 1 is bottom perspective view of the invention with the base plate of the circular saw removed.
Figure 2:
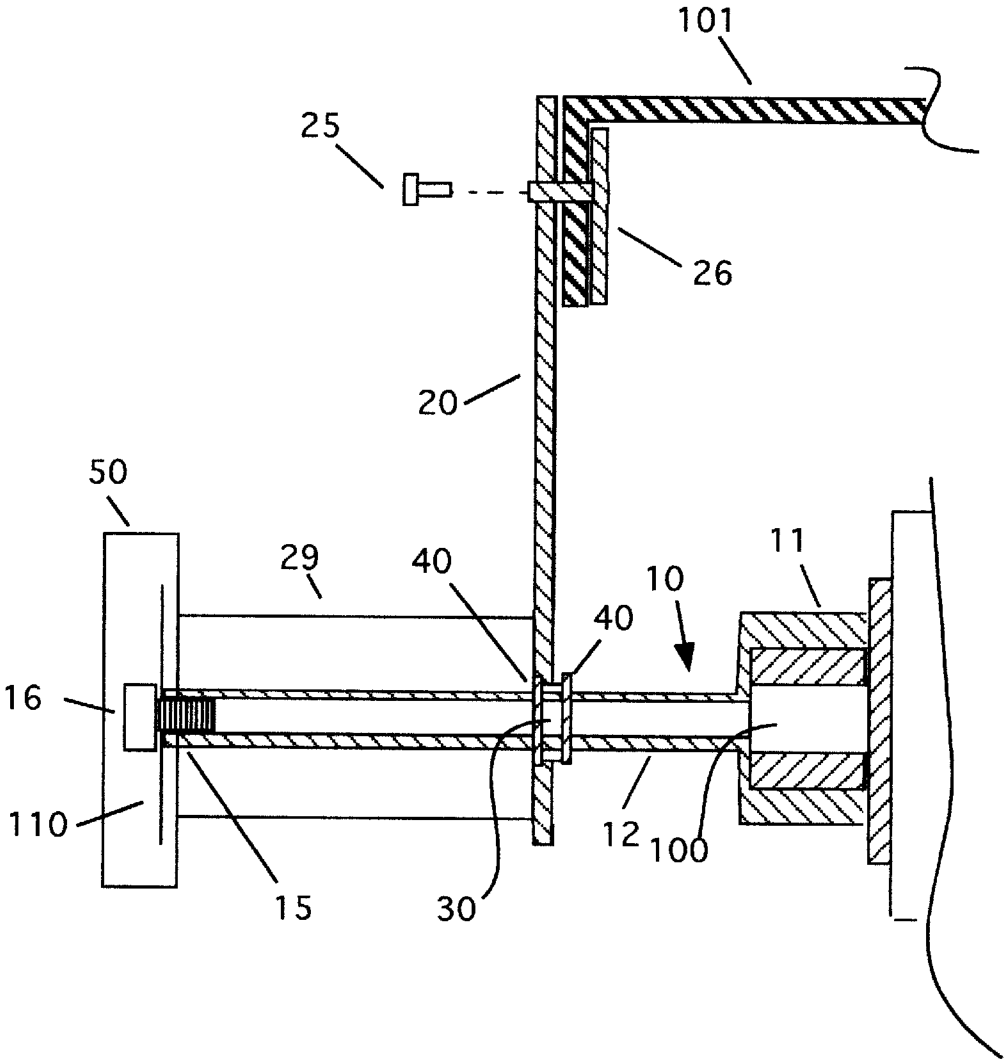
FIG. 2 is a cross-sectional view of the circular saw with the invention installed.

Referring now to FIGS. 1 and 2, the basic elements of the toe kick system are shown. The drawings here show a saw with an extra wide guard, which is designed for an optional dado blade system that is the subject my another patent application Ser. No. 09/949,410 that is now U.S. Pat. No. 6,463,970. The use of the wide guard here is done for clarity. The attachment can be easily built for any saw by adjusting the dimensions as discussed below.

The system uses the standard arbor 100 found on a circular saw. The retaining screw, normally used to hold a blade in place, is removed. An extension arbor 10 is used to move the rotation of the saw arbor to a point outward from the saw body at a sufficient distance to enable the saw to be used to cut under toe kicks.

The extension arbor 10 has a proximate end 11 that has an enlarged end that fits over the saw arbor 100. The enlarged end 11 is hollowed out to permit the arbor 100 to fit inside. In the preferred embodiment, the enlarged end 11 is designed to friction fit over the saw arbor 100. Of course, the extension arbor 10 could be secured with set screws and similar fasteners, but these are not preferred.

The proximate end of the extension arbor is designed to extend from the saw arbor to the inside edge of the saw guard 101. Note that, the extension arbor 10 also has a distal end 12 that extends outward as shown. The distal end 12 begins where the extension arbor 10 passes through the guard 101. The distance from the saw arbor 100 to the inside edge of the guard 101 varies from saw to saw. Thus, in the preferred embodiment, the proximate end 11 of the extension arbor 10 is produced in different lengths to accommodate the different saws. This is not difficult and is well within the skill of one in the art.

The saw has a guard 101 that is designed to cover and protect the user from a blade. In this case, there is no blade installed. The guard 101 is used to support an outer brace 20.

Figure 6:
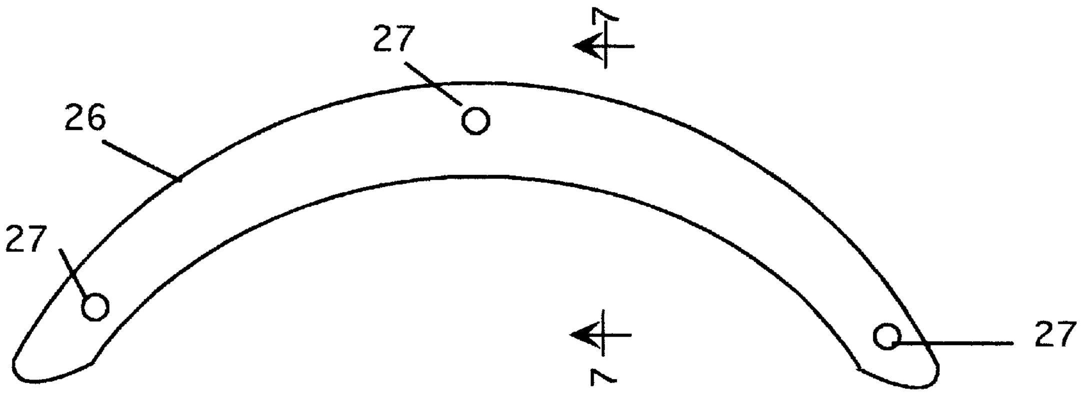
FIG. 6 is a front view of the backing plate retaining bar.
Figure 7:
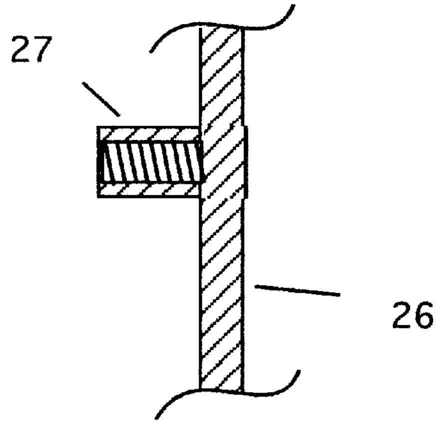
FIG. 7 is a cross-sectional view of the back plate taken along the lines 7—7 of FIG. 6.

The outer brace 20 is attached to the guard 101 by screws 25. A backing plate 26 (see FIGS. 2, 6 and 7) is installed along the inside edge of the guard 101. The backing plate 26 has threaded studs 27 that pass through holes drilled in the guard 101. The outer brace 20 has holes that align with the studs. Screws or bolts 25 are then used to secure the outer brace 20 to the backing plate 26. The backing plate is used to strengthen the guard and to provide a means for securely screwing the outer brace to the guard.

The outer brace 20 has a bushed opening 30 near the bottom of the brace 20. The bushed opening 30 is designed to be aligned with the extension arbor 10 as it passed through the saw guard 101. The bushed opening 30 can have a simple bushing installed in it or, in the preferred embodiment, it has a bearing. The bushed opening 30 allows the extension arbor 10 to rotate freely in the bushed opening. To keep the distal end 12 of the extension arbor 10 in place (i.e., to prevent it from moving laterally within the bushed opening), a pair of locking type slip washers or "keepers" 40 are used to hold the extension arbor 10 in place. The locking washers 40 are placed on both sides of the bearing in the bushed opening 30, as shown.

The outer guard 20 also has an extension guard 29 that is attached or otherwise formed onto the outer guard. In the preferred embodiment, the guard extension is a curved piece of metal that is attached to the outside of the outer guard as shown. It is designed to cover the arbor for protection when the saw is in use. The distal end 15 of the extension arbor 10 is threaded to accept a bolt 16. The end 15 of the arbor is sized to act as an arbor for small trim blades 110 that are common to the art. The trim blade is placed on this arbor and secured with the bolt 16.

At the outer end of the extension guard 29 is a blade guard 50, the blade guard 50 is formed as a semi-circle to allow the blade full access to a floor surface, while protecting users and the cabinets above. Note that the extension guard 29 may also have a retractable guard 65 (shown in FIG. 1) similar to those used on a circular saw to cover the bottom of the blade.

Figure 3:
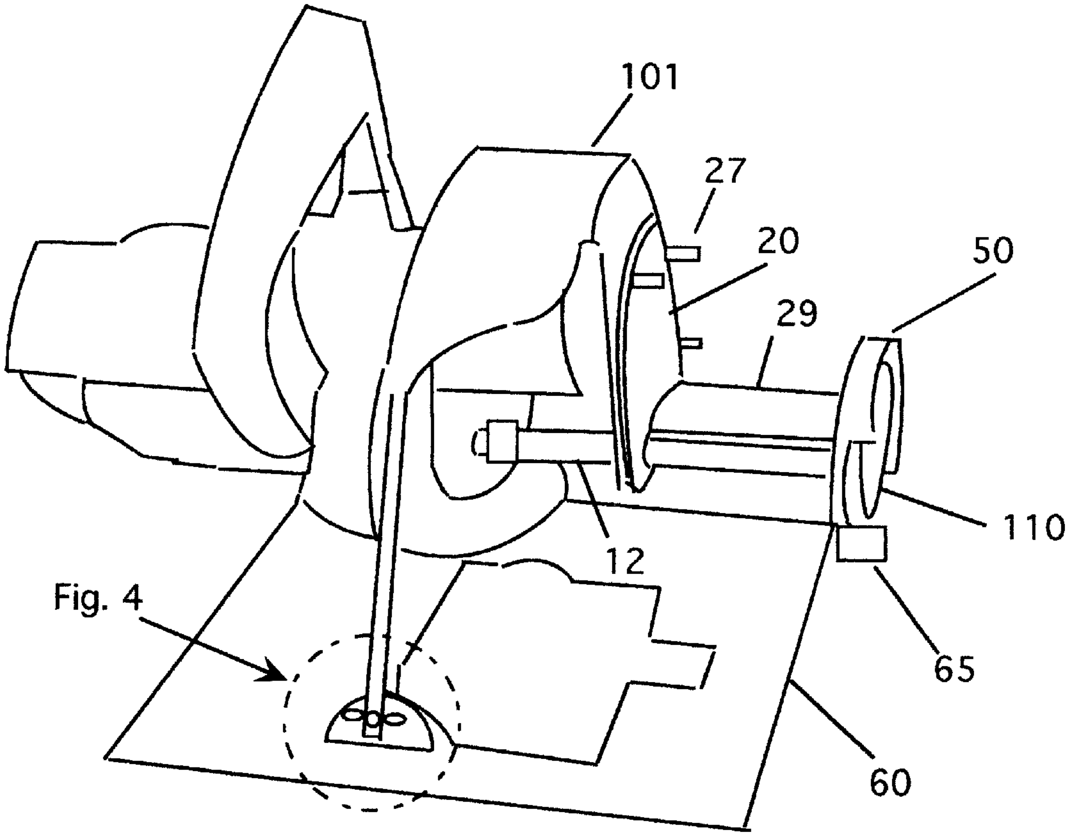
FIG. 3 is a perspective rear view of the invention installed on a circular saw with the base plate in position.

As shown in FIG. 3, all commercial circular saws have a flat base 60. These bases provide a flat surface that supports the saw when making ordinary cuts. Typically, these bases have an angle adjustment screw that allows the base to be pivoted up to 45 degrees. This angular adjustment feature is not important to this invention, other than the fact that this screw can be removed, allowing the base plate to come off the saw. At the back of the base plate is a blade height adjustment mechanism. This system is used to raise or lower the base plate, which in turn, reveals more or less of the blade—when the saw is used ordinarily. This feature allows a saw to cut through thin plywood or thick planks with a simple adjustment. This height adjustment feature is also not important to this invention. However, on most models of saw, the height adjustment mechanism is not removable. Although this is not a problem under many conditions, even with the new system in place—the base can often be used to ensure that the saw is held flat against the floor—and, as shown in FIG. 3, the extension arbor is designed to extend past the side edge of the base, it does restrict the depth that the blade can reach. On occasion, it may be necessary to go deeper than the saw with the base plate will allow. To accomplish this, in the preferred embodiment, the base plate is designed to be removed.

Figure 4:
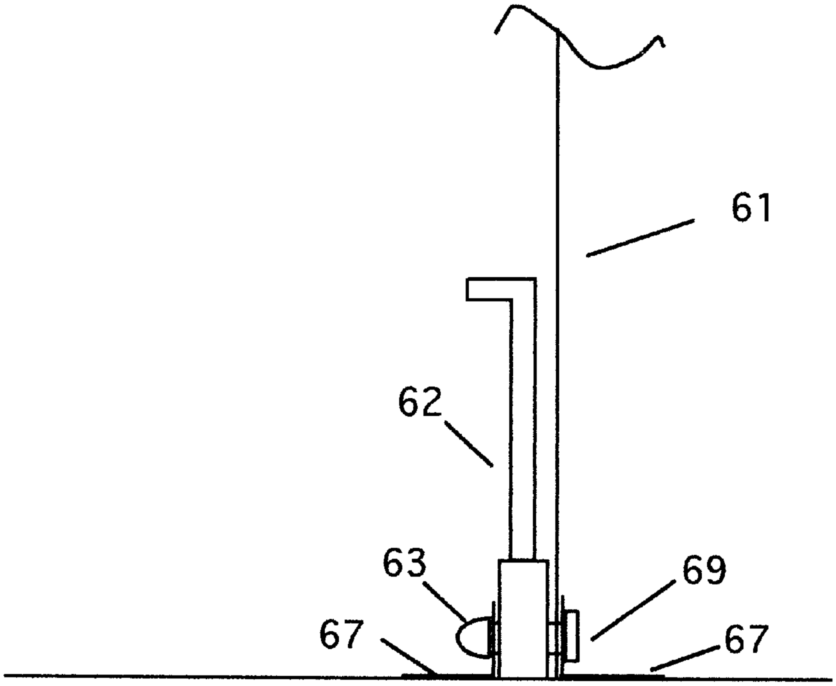
FIG. 4 is a detail view of the base plate height adjustment mechanism.
Figure 5:
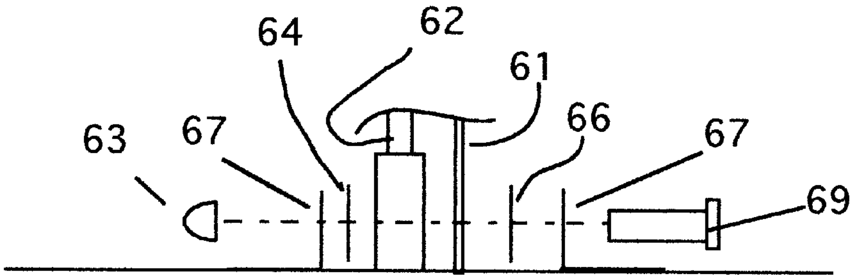
FIG. 5 is an exploded detail view of the base plate height adjustment mechanism.

To that end, FIGS. 4 and 5 show modifications to one type of height adjustment mechanism commonly found on circular saws. In this system, a curved vertical slide 61 is on the back of the saw guard located between the saw guard and the motor. The base 60 has a slot that allows the vertical slide to pass through it as the adjustment is made. An adjustment lever 62 is set in place on a hex nut 63 so that it can rotate, but not be removed. The adjustment lever 62 has a cam on the bottom edge that is placed between two brackets. In the open position, the cam is at the narrowest extent, which allows the base plate 60 to be slid up and down along the vertical slide 61 as needed to get the desired blade height. Once set, the lever 62 is rotated until the cam is held between the two brackets. At this point, the saw is ready for use.

For example, on one type of saw, the lever rides in a hex nut that is seated on a pin 69 between a backing washer 64 and a keeper ring 66, which are positioned between two brackets 67. By removing the keeper ring 66 and sliding the adjustment handle 62 off the hex nut 63, the hex nut 63 can be turned off to remove the pin 69 that holds the rear portion of the base plate. As mentioned above, when the front angular adjustment screw is also removed, the base can be removed from the saw. The saw with the base removed is shown in FIG. 1. With the base removed, the saw blade can penetrate and additional ⅜ inch. This is often times enough to cut through the thickest floor-sub floor combination.

Operation of the saw is simple and easy. Once the blade assembly is in place. The saw is placed on the floor and the blade is placed under a cabinet toe kick. The saw is started and a line is cut along the cabinet bases all around the perimeter of the cabinet, or wherever the work is to be done. The saw is removed. The floor can then be cut up using standard saws, working from the inside of the room toward the cabinets. As the floor is removed, the previously formed cut acts as a stop cut to prevent the floor from being removed under the cabinets or from damaging the cabinets themselves. This makes the job of floor removal straightforward, safe, fast and efficient.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A toe kick saw accessory comprising:

a) an extension arbor, having a proximate end and a distal end;

b) whereby the proximate end of said extension arbor having an arbor fitting attached thereto; said arbor fitting being sized to fit over an arbor on a circular saw;

c) whereby the distal end of said extension arbor has a threaded arbor for securing a trim blade thereto;

d) a means for securing said trim blade to said distal end of said extension arbor;

e) an outer brace, attached to said extension arbor, at a point between said proximate end and said distal end of said extension arbor;

f) said outer brace having a bushed opening therein to allow said extension arbor to rotate in said bushed opening, independent of said outer brace; and g) means for securing said outer brace to a circular saw guard.

2. The toe kick saw accessory of claim 1 further comprising an extension guard covering said distal end of said extension arbor.

3. The toe kick saw accessory of claim 1 wherein the means for securing the trim blade comprises a bolt.

4. The toe kick saw accessory of claim 1 wherein the means for securing the outer brace comprise at least two fasteners.

5. The toe kick saw accessory of claim 1 wherein the bushed opening in said outer brace included a bearing therein.

6. The toe kick saw accessory of claim 1 further comprising two locking keeper washers, one of said two locking keeper washers being operably installed against one side of said bushed opening and a second of said two locking keeper washers being operably installed against a second side of said bushed opening; said two locking keeper washers being used to restrict lateral movement of said extension arbor in said bushed opening.

7. A toe kick saw accessory in combination with a circular saw having a blade guard and a base plate, comprising:

a) an extension arbor, having a proximate end and a distal end;

b) whereby the proximate end of said extension arbor having an arbor fitting attached thereto; said arbor fitting being sized to fit over an arbor on a circular saw;

c) whereby the distal end of said extension arbor has a threaded arbor for securing a trim blade thereto;

d) a means for securing said trim blade to said distal end of said extension arbor;

e) an outer brace, attached to said extension arbor, at a point between said proximate end and said distal end of said extension arbor;

f) said outer brace having a bushed opening therein to allow said extension arbor to rotate in said bushed opening, independent of said outer brace, and further wherein said outer brace having at least two mounting holes therein;

g) an inner support bracket, said inner support bracket having a set of threaded studs that correspond the position of said mounting holes in said outer brace;

h) said blade guard on said circularsaw also having a set of through holes formed therein, said through holes corresponding to the position of said set of threaded studs in said inner support bracket; and i) a set of bolts; said set of bolts being used to secure said outer brace and said inner support bracket to said blade guard by passing said set of bolts through said mounting holes in said outer brace, through said set of through holes in said blade guard and into said set of threaded studs in said inner support bracket.

8. The combination of claim 7 further comprising an extension guard covering said distal end of said extension arbor.

9. The combination of claim 7 wherein the means for securing the trim blade comprises a bolt.

10. The combination of claim 7 wherein the bushed opening in said outer brace included a bearing therein.

11. The combination of claim 7 further comprising two locking keeper washers, one of said two locking keeper washers being operably installed against one side of said bushed opening and the other of said two locking keeper washers being operably installed against a second side of said bushed opening, said two locking keeper washers being used to restrict lateral movement of said extension arbor in said bushed opening.

12. The combination of claim 7 wherein said base plate is removable from said circular saw.

13. The combination of claim 7 further comprising a means for temporarily removing said base plate from said circular saw.

14. The combination of claim 13 wherein the a means for temporarily removing said base plate from said circular saw include a means for removing a blade height adjustment mechanism from said circular saw.

* * * * *